Feb. 2, 1932.  L. G. FIRTH  1,843,549
METHOD OF SECURING TIPS TO TOOL HOLDERS
Filed Aug. 16, 1929
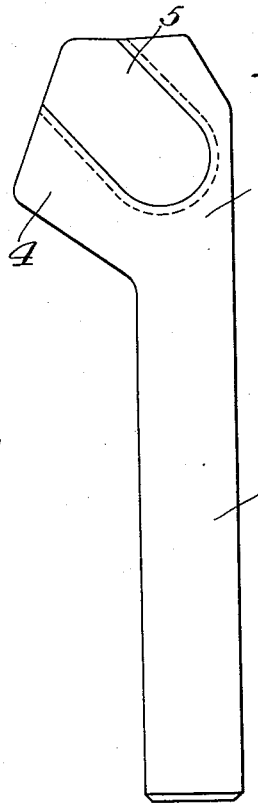
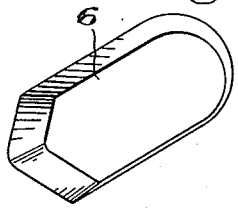
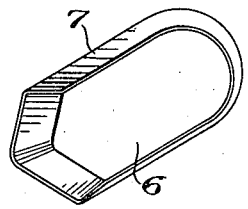
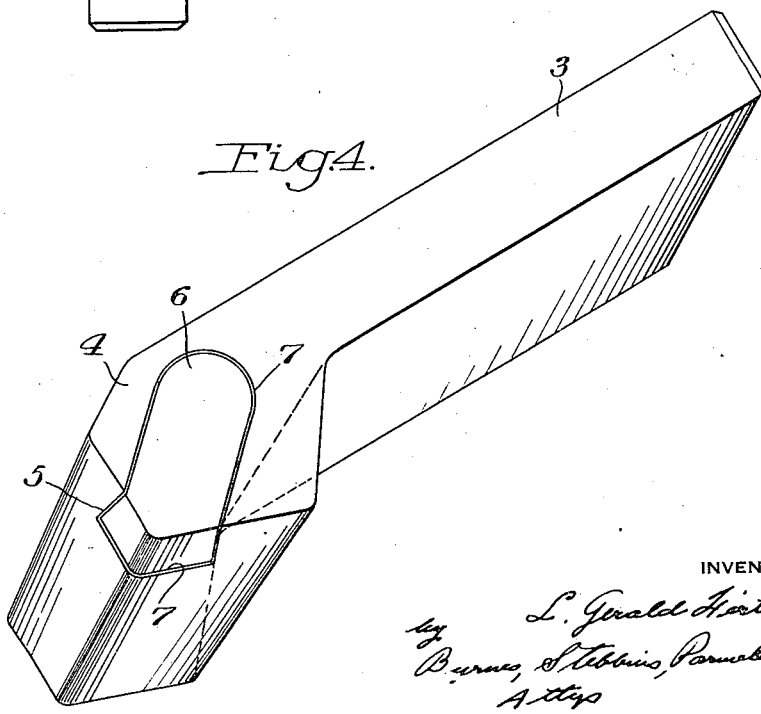
INVENTOR
L. Gerald Firth
by Burns, Stebbins, Parmelee & Blenko
Attys Patented Feb. 2, 1932

1,843,549

UNITED STATES PATENT OFFICE

LEWIS GERALD FIRTH, OF PITTSBURGH, PENNSYLVANIA, ASSIGNOR TO FIRTH-STERLING STEEL COMPANY, OF McKEESPORT, PENNSYLVANIA, A CORPORATION OF PENNSYLVANIA

METHOD OF SECURING TIPS TO TOOL HOLDERS

Application filed August 16, 1929. Serial No. 386,391.

This invention relates generally to a method of making tools, and more particularly to a method of making tools comprising a holder having a recess in which is secured a cutting tip of very hard material.

Tools of the general type to which this invention relates have been known heretofore. The cutting tip ordinarily is formed of particles of an abrasive such as tungsten carbide, silicon carbide, or vitrified zirconium oxide embedded in a matrix of a metal such as iron, nickel or cobalt. These cutting tips are made by mixing finely divided abrasive particles with finely divided metal, such as iron, and then molding the tool by the application of heat and pressure. The cutting tips ordinarily are secured to the tool holder, which usually is steel, by brazing or welding the tip to the holder. A recess is formed in the holder and thereafter the tip is brazed or welded in place. The tip is secured to the walls of the recess by the brazing or welding process.

The cutting tips have a coefficient of expansion which is from about one-fifth to one-third the coefficient of expansion of the steel holder. If the tip is brazed or welded to the holder, the expansion and contraction of the holder when in use tends to tear apart or to crush the cutting tip. The cutting tip is an aggregate of cutting or abrasive particles embedded in a matrix of binding metal, and this aggregate will not stand up under repeated expansion and contraction when the cutting tip is united to the tool holder.

In the accompanying drawings which illustrate the present preferred form of my invention, Figure 1 is a plan view of a tool holder having a recess adapted to receive a cutting tip;

Figure 2 is a perspective view of the cutting tip;

Figure 3 is a perspective view of the cutting tip having a coating of copper thereon, and Figure 4 is a perspective view of the completed tool.

In accordance with my invention, a recess is formed in the tool holder and the holder is then heated. This expands the holder so that the cutting tip can be inserted into the recess. The tip and holder are thereafter cooled, causing the holder to contract and to hold the tip in the recess. In the preferred form of the invention, the recess is made dovetailed so as to prevent the tip from becoming detached from the holder.

It is preferable to coat either the tip or the holder, or both, with a relatively soft metal or alloy, such as copper or bronze, before inserting the tip into the recess in the holder. This coating metal acts as a lubricating and cushioning means for the tip. The tip may be coated with metal by any desired method such as by electroplating. The provision of a coating of metal on the tip or holder, or both, takes care of any inequalities in the contraction of the holder after the tip has been inserted into the recess and the holder and tip are cooled in order to secure the tip to the holder. During the shrinking operation it prevents excessive pressure on the cutting tip, allowing any excess of the coating metal to squeeze out between the tip and the walls of the recess.

In heating the holder to expand it so that the tip may be inserted in the recess, care should be taken not to heat the holder above the melting point of the metal used for coating as this would rigidly unite the tip to the holder on cooling and so give rise to the disadvantages pointed out in connection with the brazing or welding operation. The heating step is preferably carried out in a non-oxidizing or reducing atmosphere, for example, in an atmosphere of hydrogen. This prevents the parts from being coated with a film of oxide.

Tools having cutting tips of the character contemplated by my invention are operated at very high speeds. The chips cut from the material being machined are unusually hot and are larger than the chips which are formed when the usual cutting tools are employed. These chips tend to attack the tool holder adjacent the end to which the tip is secured. In order to prevent or minimize the effect of the hot chips on the tool holder, I prefer to use a steel holder capable of being hardened. The hardening preferably is carried out in air. Certain nickel chromium steels have this property of hardening in air.

In carrying out the process, the cutting tip or the holder, or both, are coated with a layer of copper or other relatively low-melting point metal. A steel capable of hardening in the air is employed for the tool holder. A recess adapted to receive the cutting tip is formed in the holder and the holder is then heated in an atmosphere of hydrogen to a temperature below the melting point of copper, but above the critical point of the holder. For certain nickel chromium steels capable of air hardening, this temperature will be in the neighborhood of 1400° F. The holder having the tip inserted in the recess is then cooled in air in order to harden it, thus providing protection against chips and in order to secure the tip in the recess due to the greater contraction of the holders.

Referring more particularly to the drawings, the tool holder 2 has a shank 3, and a head 4 which is materially larger than the shank. The head is provided with a dovetailed recess 5 adapted to receive a cutting tip 6. The cutting tip 6 having a coating of copper 7 is illustrated in Figure 3. The complete tool with the tip 6 in the dove-tailed recess 5, and having a coating 7 between the cutting tip and the walls of the recess is illustrated in Figure 4.

In describing the invention, I have referred more particularly to cutting tips in which the cutting particles are tungsten carbide. The invention, however, is applicable to all tips of the general type comprising a cutting agent, or cutting agents, embedded in a matrix of a metal or an alloy. Either the cutting tip alone or the holder alone, or both, may be coated with the coating metal, and in the claims the expression "coating the tip" is intended to include coating either of the elements to be secured together, or both elements.

I have illustrated and described the present preferred form of the invention. It is to be understood, however, that the invention may be otherwise embodied within the scope of the following claims.

I claim:

1. The method of securing a tungsten carbide cutting tip to a tool holder having a recess therein adapted to receive the tip, comprising coating the tip with a metallic lubricating medium, heating the holder to expand it, inserting the tip in the recess, and cooling the tip and holder.

2. The method of securing a tungsten carbide cutting tip to a steel tool holder capable of hardening by heat treatment, comprising forming a recess in the holder adapted to receive the tip, coating the tip with a metallic lubricating medium, heating the holder above its critical temperature but below the melting point of the lubricating medium, inserting the tip in the recess, and cooling the tip and holder to harden the holder and secure the tip in the recess.

3. The method of securing a tungsten carbide cutting tip to a steel tool holder capable of hardening in air, comprising forming a recess in the holder adapted to receive the tip, coating the tip with a relatively low melting point metal, heating the holder to a temperature above its critical point, but below the melting point of the coating metal, inserting the tip in the recess, and cooling the tip and holder in air to harden the holder and secure the tip in the recess.

4. The method of securing a tungsten carbide cutting tip to a steel tool holder capable of hardening in air, comprising forming a recess in the holder adapted to receive the tip, coating the tip with copper, heating the holder to a temperature above its critical point, but below the melting point of copper, inserting the coated tip in the recess, and cooling the tip and holder in air to harden the holder and secure the tip in the recess.

5. The method of securing a cutting tip to a tool holder having a recess therein adapted to receive the tip, comprising coating the tip with a metallic lubricating and cushioning medium, heating the tool to expand it, inserting the tip in the recess, and cooling the tip and holder.

In testimony whereof I have hereunto set my hand.

L. GERALD FIRTH.